US012341253B2

(12) United States Patent
Komura

(10) Patent No.: US 12,341,253 B2
(45) Date of Patent: Jun. 24, 2025

(54) ANTENNA MODULE AND ARRAY ANTENNA

(71) Applicant: Murata Manufacturing Co., Ltd., Nagaokakyo (JP)

(72) Inventor: Ryo Komura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 212 days.

(21) Appl. No.: 18/353,897

(22) Filed: Jul. 18, 2023

(65) Prior Publication Data

US 2023/0361484 A1 Nov. 9, 2023

Related U.S. Application Data

(63) Continuation of application No. PCT/JP2022/004436, filed on Feb. 4, 2022.

(30) Foreign Application Priority Data

Feb. 18, 2021 (JP) ................................ 2021-024511

(51) Int. Cl.

*H01Q 21/06* (2006.01)
*H01Q 1/22* (2006.01)
*H01Q 9/04* (2006.01)

(52) U.S. Cl.

CPC ......... *H01Q 21/065* (2013.01); *H01Q 1/2283* (2013.01); *H01Q 9/0428* (2013.01)

(58) Field of Classification Search

CPC .... H01Q 1/2283; H01Q 1/243; H01Q 9/0428; H01Q 21/065

See application file for complete search history.

(56) References Cited

U.S. PATENT DOCUMENTS

2020/0313306 A1 10/2020 Kamgaing et al.

FOREIGN PATENT DOCUMENTS

| | | | | |
|---|---|---|---|---|
| CN | 109962335 B | * 12/2020 | ............... | H01Q 1/38 |
| CN | 113711442 A | * 11/2021 | ........... | G01S 13/288 |
| JP | S53-15042 A | 2/1978 | | |

(Continued)

OTHER PUBLICATIONS

International Search Report and Written Opinion mailed on Apr. 19, 2022, received for PCT Application PCT/JP2022/004436, filed on Feb. 4, 2022, 10 pages including English Translation.

*Primary Examiner* — Daniel Munoz
(74) *Attorney, Agent, or Firm* — XSENSUS LLP

(57) ABSTRACT

An array antenna is formed of a plurality of antenna modules disposed adjacent to each other and including a plurality of antenna modules. Each of the antenna modules includes a dielectric substrate, a ground electrode, and a sub-array. The sub-array is formed of a plurality of radiating elements facing the ground electrode. In the sub-array, the plurality of radiating elements are arranged in a matrix, and each includes multiple feeding points. The sub-array is disposed along an end portion of the dielectric substrate. The sub-array has a center deviated from a center of the dielectric substrate toward the end portion. An end portion of a first antenna module faces an end portion of a second antenna module in a first direction that is defined as a direction from the first antenna module toward the second antenna module. The first antenna module is rotationally symmetric to the second antenna module.

20 Claims, 11 Drawing Sheets

(56) References Cited

FOREIGN PATENT DOCUMENTS

| | | | |
|---|---|---|---|
| JP | H02-179008 | A | 7/1990 |
| JP | H03-157006 | A | 7/1991 |
| JP | 2007-534181 | A | 11/2007 |
| JP | 2018-507654 | A | 3/2018 |
| WO | 2020/241271 | A1 | 12/2020 |

* cited by examiner

ANTENNA MODULE AND ARRAY ANTENNA

CROSS-REFERENCE TO RELATED APPLICATIONS

This application is a continuation of international application no. PCT/JP2022/004436, filed Feb. 4, 2022, which claims priority to Japanese patent application no. JP2021-024511, filed Feb. 18, 2021. The entire contents of both prior applications are hereby incorporated by reference.

TECHNICAL FIELD

The present disclosure relates to an antenna module and an array antenna, and a technique for improving the antenna characteristics in an array antenna.

BACKGROUND ART

A conventional array antenna includes a plurality of sub-arrays formed by using four circularly polarized antenna elements are disposed on a dielectric substrate to be rotated 90°. In the array antenna, the sub-arrays are paired, so that adverse effects on an axial ratio can be prevented.

CITATION LIST

Patent Document

Patent Document 1: Japanese Unexamined Patent Application Publication No. 3-157006

SUMMARY

Technical Problem

In recent years, in communication apparatuses represented by mobile terminals such as cellular phones or smartphones, techniques of using radio frequency signals in high frequency bands such as millimeter waves or microwaves have been developed.

In general, in an antenna module used in a communication apparatus, as the frequency band to be used becomes higher, the size of a radiating element that radiates a radio wave becomes smaller. In addition, in a case of an array antenna using a plurality of radiating elements, as the frequency band becomes higher, the pitch between the radiating elements also becomes smaller, and the region in which the radiating elements are arranged on the dielectric substrate becomes smaller.

In a case of an array antenna, if all radiating elements are disposed on a single dielectric substrate, the size of the substrate is increased, which may cause difficulty in handling during manufacturing, deterioration in mountability due to warpage generated in the dielectric substrate, or addition of a step and an increase in manufacturing cost for correcting the warpage. In order to solve such a problem, for example, one array antenna may be formed by combining a plurality of sub-arrays.

In each sub-array, radiating elements to be mounted are often disposed near the center of the dielectric substrate. However, if a target radio wave is in a higher frequency band, the interval (pitch) between the radiating elements in each sub-array may be different from the interval between the radiating elements in adjacent sub-arrays. In such a case, when the radiation direction of a combined wave is changed by beam forming in the array antenna, the antenna characteristics may be deteriorated due to the unevenness of the pitch.

The present disclosure has been made to solve at least the above-described problem, and improves the antenna characteristics of an array antenna formed of a plurality of sub-arrays disposed adjacent to each other.

Solution to Problem

An array antenna according to a first exemplary aspect of the present disclosure is formed of a plurality of antenna modules disposed adjacent to each other. Each of the plurality of antenna modules includes a dielectric substrate, a first ground electrode disposed in the dielectric substrate, and a sub-array. The dielectric substrate includes a first surface and a second surface facing each other. The sub-array is formed of a plurality of radiating elements facing the first ground electrode. In the sub-array, the plurality of radiating elements are arranged in a matrix, and each radiating element includes multiple feeding points. The sub-array is disposed along a first end portion of the dielectric substrate. The sub-array has a center deviated from a center of the dielectric substrate toward the first end portion. The plurality of antenna modules include a first antenna module and a second antenna module adjacent to each other. A first end portion of the first antenna module faces a first end portion of the second antenna module in a first direction that is defined as a direction from the first antenna module toward the second antenna module. The first antenna module is rotationally symmetric to the second antenna module.

An antenna module according to a second exemplary aspect of the present disclosure is configured to be capable of forming an array antenna by being disposed adjacent to another antenna module. The antenna module includes a dielectric substrate, a ground electrode disposed in the dielectric substrate, and a sub-array. The sub-array is formed of a plurality of radiating elements facing the ground electrode. The plurality of radiating elements are arranged in a matrix, and each radiating element includes multiple feeding points. The sub-array is disposed along a first end portion of the dielectric substrate. The sub-array has a center deviated from a center of the dielectric substrate toward the first end portion.

An array antenna according to a third exemplary aspect of the present disclosure includes a first dielectric substrate, a ground electrode disposed in the first dielectric substrate, and a plurality of antenna modules disposed adjacent to each other on the first dielectric substrate. Each of the plurality of antenna modules includes a second dielectric substrate and a sub-array formed of a plurality of radiating elements facing the ground electrode. In the sub-array, the plurality of radiating elements are arranged in a matrix, and each radiating element includes multiple feeding points. The sub-array is disposed along a first end portion of the second dielectric substrate. The sub-array has a center deviated from a center of the second dielectric substrate toward the first end portion. The plurality of antenna modules include a first antenna module and a second antenna module adjacent to each other. A first end portion of the first antenna module faces a first end portion of the second antenna module in a first direction that is defined as a direction from the first antenna module toward the second antenna module. The first antenna module is rotationally symmetric to the second antenna module.

Exemplary Advantageous Effects

In the array antennas according to the present disclosure, for each of the plurality of antenna modules forming the array antenna, the sub-arrays formed of the plurality of radiating elements are disposed to be deviated toward the first end portion of the dielectric substrate. The adjacent antenna module is disposed such that the first end portions thereof face each other. With such a configuration, the interval between the radiating elements of the adjacent sub-arrays can be narrowed, and thus, the antenna characteristics of the array antenna can be improved.

DETAILED DESCRIPTION

Figure 1:
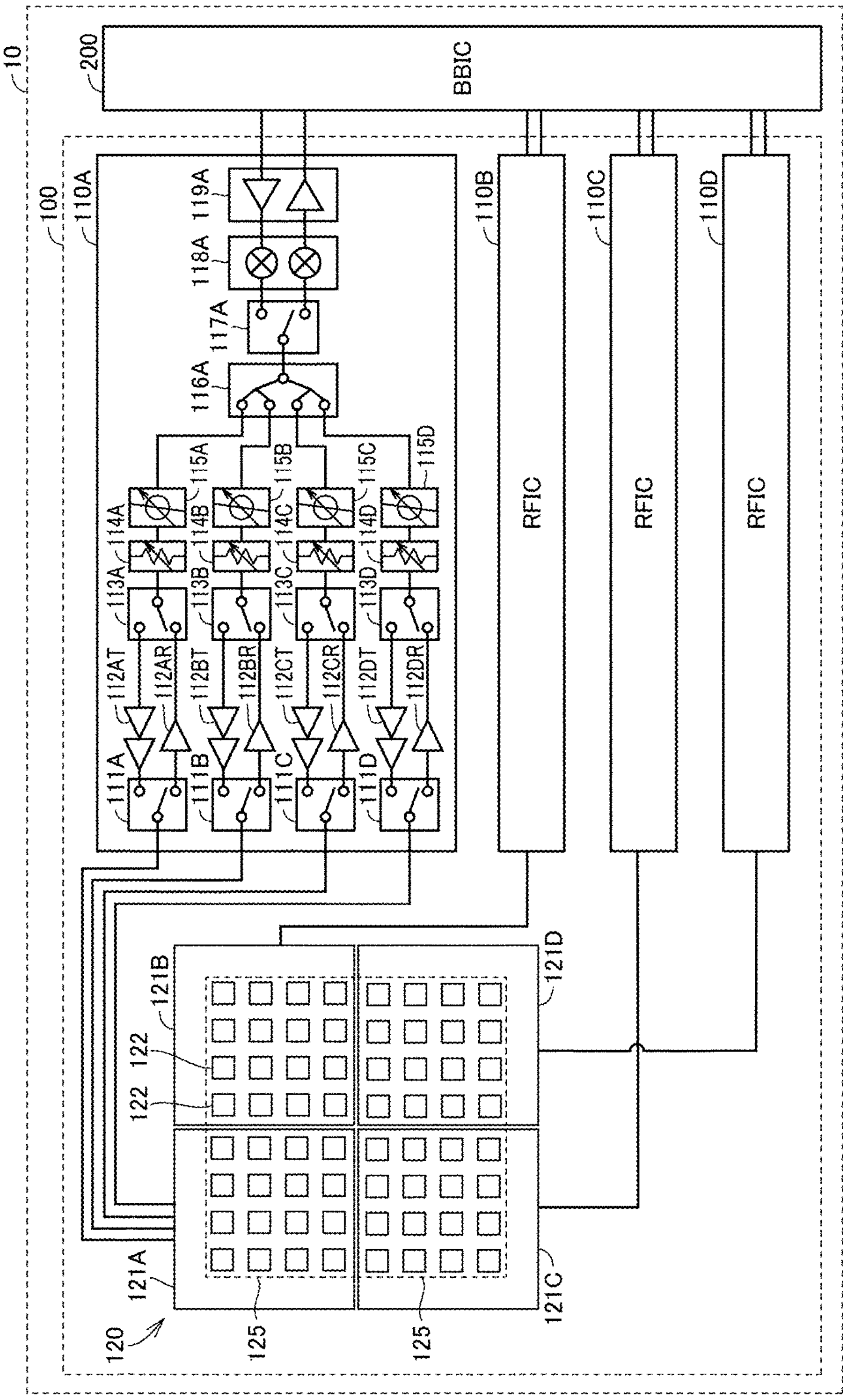
FIG. 1 is a block diagram of a communication apparatus including an array antenna according to a first exemplary embodiment.

Hereinafter, exemplary embodiments of the present disclosure will be described in detail with reference to the drawings. In the drawings, the same or corresponding parts are denoted by the same reference numerals, and the description thereof will not be repeated.

FIRST EMBODIMENT (Basic Configuration of Communication Apparatus)

FIG. 1 is an example of a block diagram of a communication apparatus 10 including an array antenna 100 according to this exemplary embodiment. The communication apparatus 10 is, for example, a mobile terminal such as a cellular phone, a smartphone, or a tablet, a personal computer having a communication function, or a base station. Examples of frequency bands of radio waves used in the array antenna 100 according to this embodiment are radio waves in the millimeter wave band whose center frequencies are, for example, 28 GHz, 39 GHZ, 60 GHZ, and the like. However, radio waves in a frequency band other than the above frequency bands are also applicable.

Referring to FIG. 1, the communication apparatus 10 includes the array antenna 100 and a base band integrated circuit (BBIC) 200 (baseband signal processing circuit). The array antenna 100 includes an antenna apparatus 120 and a radio frequency integrated circuits (RFICs) 110A to 110D, each of which is an example of a feeder circuit. In the following description, the RFICs 110A to 110D may be collectively referred to as an "RFIC 110".

In the communication apparatus 10, a signal transmitted from the BBIC 200 to the array antenna 100 is up-converted by the RFIC 110 into a high-frequency signal and is radiated from the antenna apparatus 120, and a high-frequency signal received by the antenna apparatus 120 is down-converted by the RFIC 110 and processed by the BBIC 200.

The antenna apparatus 120 includes four antenna modules 121A to 121D two dimensionally arranged in 2×2. In each antenna module, a plurality of radiating elements 122 are arranged in a two dimensional matrix. In each antenna module, a sub-array 125 is formed of the plurality of radiating elements 122. The sub-array 125 is a region indicated as the inside of the broken line in the drawing in each antenna module and including the plurality of uniformly disposed radiating elements 122. In the example in FIG. 1, the sub-array 125 is a region in which a total of 16 radiating elements 122 are disposed in 4×4. In other words, the sub-array 125 is a rectangular region in which the plurality of radiating elements 122 are inscribed.

By the four antenna modules 121A to 121D disposed adjacent to each other, an array antenna including a total of 64 radiating elements 122 in 8×8 is formed as the entire antenna apparatus 120. In this exemplary embodiment, a patch antenna having a substantially square flat plate shape is described as an example of the radiating element 122, but the shape of the radiating element 122 may be a circle, an ellipse, or another polygonal shape such as a hexagon.

In a case of an array antenna, if all radiating elements are disposed on a single dielectric substrate, the size of the substrate is increased, which may cause difficulty in handling during manufacturing, deterioration in mountability due to warpage generated in the dielectric substrate, or addition of a step and an increase in manufacturing cost due for correcting the warpage. By forming one array antenna by combining a plurality of antenna modules as in this exemplary embodiment, it is possible to suppress the above-described difficulty in handling and/or the generation of warpage during manufacturing.

The RFICs 110A to 110D are respectively connected to the antenna modules 121A to 121D. The RFICs 110A to 110D have the same circuit configuration. In FIG. 1, in order to facilitate the description, details of only the circuit configuration of the RFIC 110A are illustrated, and the circuit configurations of RFICs 110B to 110D are omitted. In the following description, the RFIC 110A will be described as a representative.

An example of the RFIC 110A having four signal paths is illustrated. In this example, at the antenna module 121A, each output signal is distributed to four radiating elements 122. The number of signal paths included in the RFIC 110A is not limited to four. For example, the RFIC 110A may include only one signal path, or may include as many signal paths as the radiating elements 122 included in the corresponding antenna module.

The RFIC 110A includes switches 111A to 111D, 113A to 113D, and 117, power amplifiers 112AT to 112DT, low-noise amplifiers 112AR to 112DR, attenuators 114A to 114D, phase shifters 115A to 115D, a signal combiner/divider 116, a mixer 118, and an amplifier circuit 119.

In transmission of a high-frequency signal, the switches 111A to 111D and 113A to 113D are switched to the power amplifiers 112AT to 112DT side, and the switch 117 is connected to a transmission-side amplifier of the amplifier circuit 119. In reception of a high-frequency signal, the switches 111A to 111D and 113A to 113D are switched to the low-noise amplifiers 112AR to 112DR side, and the switch 117 is connected to a reception-side amplifier of the amplifier circuit 119.

The signal transmitted from the BBIC 200 is amplified by the amplifier circuit 119 and up-converted by the mixer 118. The transmission signal, which is an up-converted high-frequency signal, is divided into four by the signal combiner/divider 116, passes through the four signal paths, and is fed to the radiating elements 122 included in the corresponding antenna module 121A. At this time, the directivity of the entire antenna apparatus 120 can be adjusted by individually adjusting the degrees of phase shift of the phase shifters 115A to 115D disposed in the respective signal paths. In addition, the attenuators 114A to 114D adjust the intensity of the transmission signal.

Received signals, which are high-frequency signals received by the radiating elements 122 of the antenna module 121A, pass through four different signal paths and are combined by the signal combiner/divider 116. The combined reception signal is down-converted by the mixer 118, amplified by the amplifier circuit 119, and transmitted to the BBIC 200.

The RFIC 110A is formed as, for example, a one-chip integrated-circuit component including the above-described circuit configuration. Alternatively, the devices (switches, power amplifiers, low-noise amplifiers, attenuators, phase shifters) corresponding to the respective radiating elements 122 in the RFIC 110A may be formed as a one-chip integrated-circuit component for each of the corresponding radiating elements 122. In addition, the RFIC 110 in FIG. 1 is illustrated as a configuration isolated from the antenna apparatus 120, but as will be described later with reference to FIG. 3 and the like, the RFIC 110 may be mounted on the dielectric substrate of the corresponding antenna module 121 to integrally form the antenna apparatus 120.

(Configuration of Array Antenna)

Figure 2:
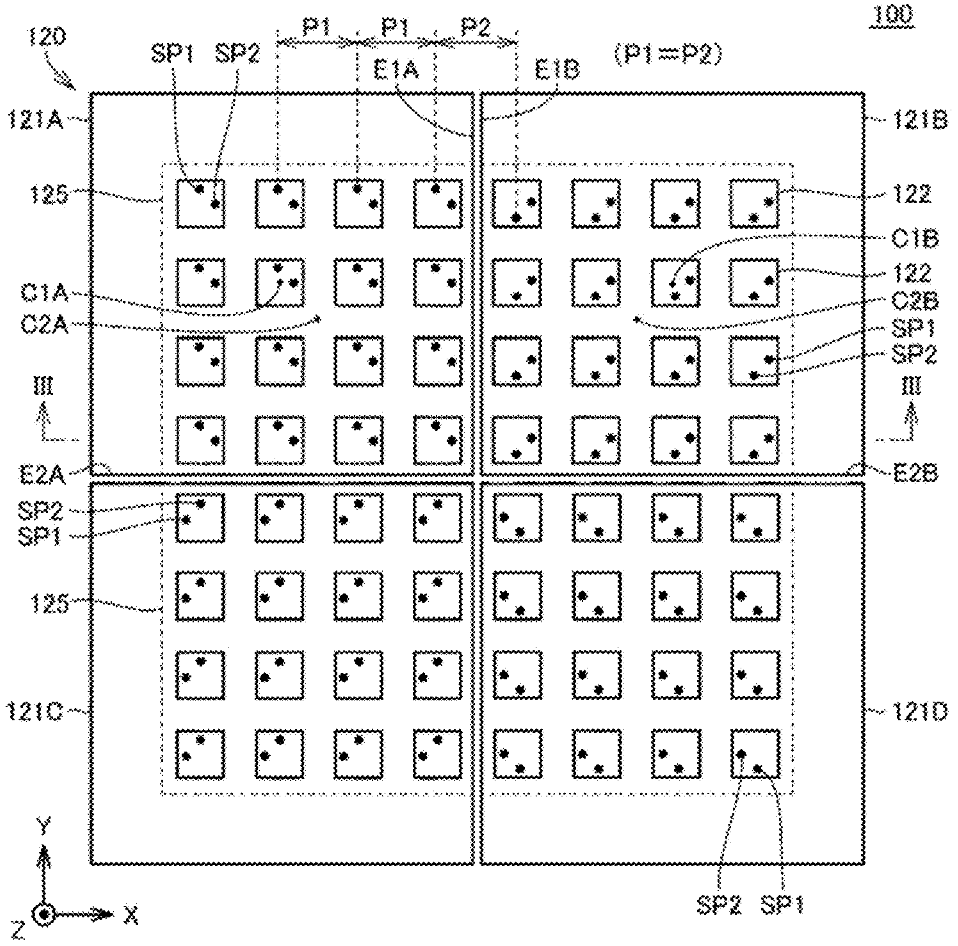
FIG. 2 is a plan view of the array antenna in FIG. 1.
Figure 3:
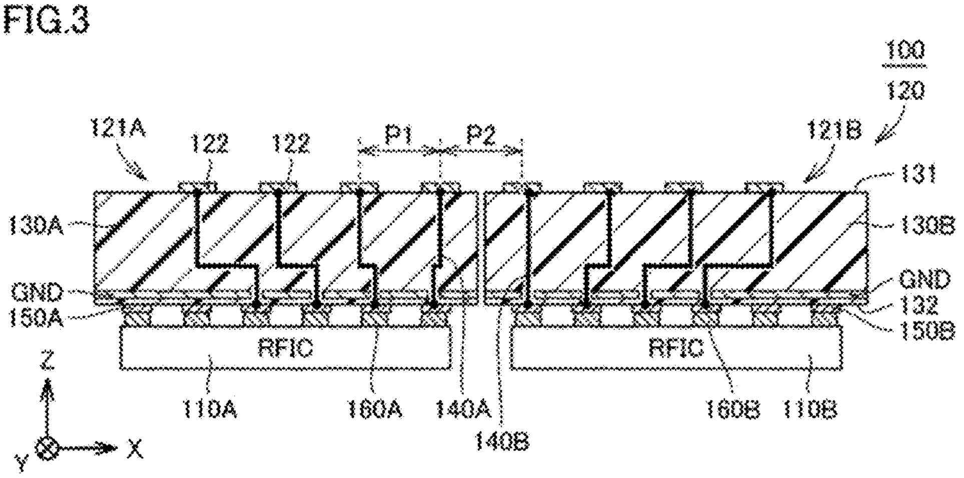
FIG. 3 is a cross-sectional view taken along line III-III in FIG. 2.

Next, the array antenna 100 in FIG. 1 will be described in detail with reference to FIGS. 2 and 3. FIG. 2 is a plan view of the array antenna 100 in FIG. 1. FIG. 3 is a cross-sectional view taken along line III-III in FIG. 2, and illustrates the antenna modules 121A and 121B of the antenna apparatus 120.

In the following description, elements common to the antenna modules 121A to 121D may be collectively described using the same reference numerals. For example, dielectric substrates 130A and 130B are referred to as a "dielectric substrate 130", and feed lines 140A and 140B are referred to as "a feed line 140". In addition, connection terminals 150A and 150B are referred to as "a connection terminal 150", and solder bumps 160A and 160B are referred to as "a solder bump 160". Similarly, antenna modules 121A and 121B are referred to as a "antenna module 121".

Referring to FIGS. 2 and 3, each of the antenna modules 121A to 121D of the antenna apparatus 120 includes the dielectric substrate 130, feed lines 140, and a ground electrode GND, in addition to the radiating elements 122 and the RFIC 110. In the following description, the normal direction of the dielectric substrate 130 in each drawing is defined as a Z-axis, the direction from the antenna module 121A toward the antenna module 121B is defined as an X-axis, and the direction from the antenna module 121C toward the antenna module 121A is defined as a Y-axis. The positive direction of the Z-axis may be referred to as an upper surface side, and the negative direction thereof may be referred to as a lower surface side.

The dielectric substrate 130 is, for example, a low temperature co-fired ceramics (LTCC) multilayer substrate, a multilayer resin substrate formed by stacking a plurality of resin layers made of a resin such as epoxy or polyimide, a multilayer resin substrate formed by stacking a plurality of resin layers made of a liquid crystal polymer (LCP) having a lower dielectric constant, a multilayer resin substrate formed by stacking a plurality of resin layers made of a fluorine-based resin, a multilayer resin substrate formed by stacking a plurality of resin layers made of a polyethylene terephthalate (PET) material, or a ceramic multilayer substrate other than LTCC. The dielectric substrate 130 does not necessarily have a multilayer structure, and may be a single-layer substrate.

The dielectric substrate 130 has a square shape in a plan view from the normal direction (Z-axis direction). On an upper surface 131 side of the dielectric substrate 130, the sub-array 125 formed of the plurality of radiating elements 122 arranged two dimensionally is disposed. As illustrated in FIG. 3, the radiating elements 122 may be disposed to be exposed on the upper surface 131 of the dielectric substrate 130, or may be disposed in an inner layer of the dielectric substrate 130 near the upper surface 131. The ground electrode GND is disposed over the entire surface of the dielectric substrate 130 and near a lower surface 132 of the dielectric substrate 130. The ground electrode GND faces each of the radiating elements 122 of the sub-array 125.

Components other than the sub-array 125 may not be disposed on the upper surface 131 of the dielectric substrate 130 not to affect the antenna characteristics. However, a connection member or the like for connection to a housing may be disposed on the upper surface 131 of the dielectric substrate 130 as long as the influence on the antenna characteristics is within an allowable range.

A plurality of connection terminals 150 for mounting electronic components such as the RFIC 110 are disposed on the lower surface 132 of the dielectric substrate 130. The connection terminals 150 are also disposed in a range that does not overlap the sub-array 125 in a plan view of the dielectric substrate 130. The RFIC 110 is connected to the connection terminals 150 with solder bumps 160 interposed therebetween.

The feed lines 140 extend from the RFIC 110 through the ground electrode GND and are connected to feed points of the respective radiating elements 122. A high-frequency signal is transmitted from the RFIC 110 to the radiating elements 122 via the feed lines 140. Although FIG. 3 illustrates an example in which each of the radiating elements 122 is connected to the RFIC 110 by an individual feed line 140, the feed line 140 may be branched in the middle to supply a high-frequency signal to the plurality of radiating elements 122.

In the array antenna 100 according to the first exemplary embodiment, two feed points SP1 and SP2 are formed in each radiating element 122, and a high-frequency signal is individually supplied from the RFIC 110 to each of the feed points SP1 and SP2. One of the feed points SP1 and SP2 is offset from the center of the radiating element 122 in the X-axis direction, and the other is offset from the center of the radiating element 122 in the Y-axis direction. As a result, a radio wave having a polarization direction in the X-axis direction and a radio wave having a polarization direction in the Y-axis direction are radiated from each radiating element 122. That is, the array antenna 100 is a so-called dual-polarization type array antenna.

In a case of the antenna module 121A, the feed point SP1 is offset from the center of the radiating element 122 in the positive direction of the Y-axis, and the feed point SP2 is offset from the center of the radiating element 122 in the positive direction of the X-axis direction. In a case of the antenna module 121B, the feed point SP1 is offset from the center of the radiating element 122 in the positive direction of the X-axis, and the feed point SP2 is offset from the center of the radiating element 122 in the negative direction of the Y-axis direction. In a case of the antenna module 121C, the feed point SP1 is offset from the center of the radiating element 122 in the negative direction of the X-axis, and the feed point SP2 is offset from the center of the radiating element 122 in the positive direction of the Y-axis direction. In a case of the antenna module 121D, the feed point SP1 is offset from the center of the radiating element 122 in negative direction of the Y-axis, and the feed point SP2 is offset from the center of the radiating element 122 in the negative direction of the X-axis direction.

That is, the antenna modules 121A to 121D have shapes rotationally symmetric to each other. The antenna module 121B has a shape obtained by rotating the antenna module 121A 90° in the clockwise (CW) direction, and the antenna module 121D has a shape obtained by further rotating the antenna module 121B 90° in the CW direction. In addition, the antenna module 121C has a shape obtained by further rotating the antenna module 121D 90° in the CW direction. In this way, by forming a plurality of antenna modules by disposing the antenna modules of the same shape in rotational symmetry, a large-size array antenna can be formed using a small number of types of modules.

In the array antenna 100 according to the first exemplary embodiment, as illustrated in the plan view in FIG. 2, the sub-array 125 in each antenna module 121 is disposed to be offset toward the center of the array antenna 100 in a plan view from the normal direction (Z-axis direction) of the dielectric substrate 130. In other words, the sub-array 125 is disposed to be deviated toward an end portion (side) facing another adjacent antenna module. More specifically, in the antenna module 121A, a center C2A of the sub-array 125 is disposed to be deviated from a center C1A of the dielectric substrate 130A toward an end portion E1A (first end portion) facing the antenna module 121B and toward an end portion E2A (second end portion) facing the antenna module 121C. Likewise, in the antenna module 121B, a center C2B of the sub-array 125 is disposed to be deviated from a center C1B of the dielectric substrate 130 toward an end portion E1B (first end portion) facing the antenna module 121A and toward an end portion E2B (second end portion) facing the antenna module 121D. The same applies to the antenna modules 121C and 121D. Since the shape of the antenna module 121 is a square, the second end portion is orthogonal to the first end portion in each antenna module 121.

In each antenna module, in a plan view from the normal direction of the dielectric substrate 130, the region of the dielectric substrate 130 where the RFIC 110 is disposed is larger than the region where the sub-array 125 is disposed. In other words, at least a portion of the RFIC 110 is disposed outside the region where the sub-array 125 is disposed.

In the sub-array 125, the plurality of radiating elements 122 are disposed at equal intervals, at a pitch P1 (first pitch) in the X-axis direction and the Y-axis direction. In addition, the sub-arrays 125 adjacent to each other are disposed such that the interval between the radiating elements 122 adjacent to each other across the end portions of the dielectric substrates 130 is a pitch P2 (second pitch). In the array antenna 100 according to the first exemplary embodiment, the antenna modules are disposed such that the pitch P1 and the pitch P2 are equal to each other (P1=P2). In this way, the sub-arrays 125 in the rotationally symmetric antenna modules 121 are disposed at a position offset with respect to the dielectric substrate 130, and the antenna modules 121 are disposed such that the pitch (pitch P2) between the radiating elements between the antenna modules is equal to the pitch (pitch P1) between the radiating elements in the sub-array 125. Thus, in the entire antenna apparatus 120, the plurality of radiating elements 122 are disposed at equal intervals in the X-axis direction and the Y-axis direction.

In each antenna module, the distance between the first end portion and end portions of radiating elements 122 that are the closest to the first end portion is set to be less than or equal to λ/4 (i.e., ½ of the pitch P1), where λ is the wavelength of a radio wave radiated from the radiating elements 122. Likewise, the distance between the second end portion and end portions of radiating elements 122 that are the closest to the second end portion is also set to be less than or equal to λ/4 (i.e., ½ of the pitch P1).

Figure 4:
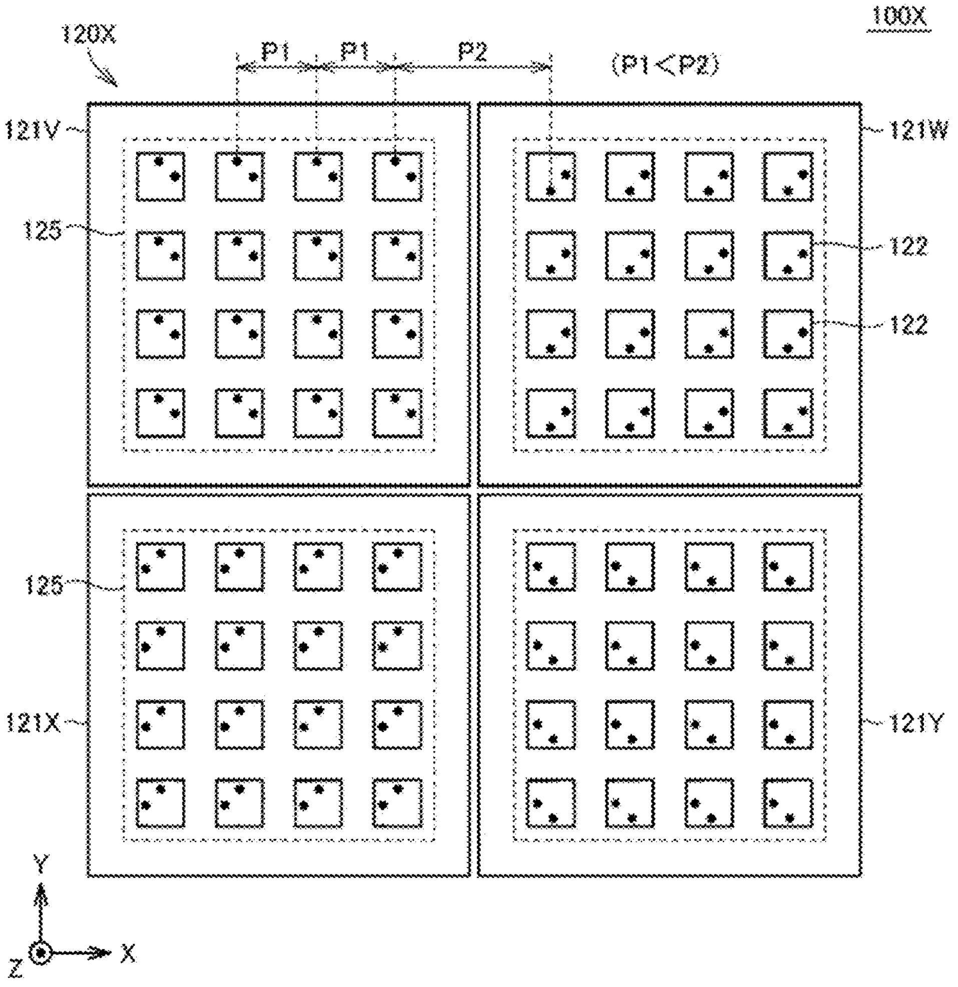
FIG. 4 is a plan view of an array antenna according to a comparative example.

FIG. 4 is a plan view of an array antenna 100X according to a comparative example. In the array antenna 100X, an antenna apparatus 120X also includes four antenna modules 121V to 121Y two dimensionally arranged in 2×2. However, in the array antenna 100X, the sub-array 125 of each antenna module is disposed at the center of the dielectric substrate. In such disposition, for the four sides of the sub-array 125, a margin is uniformly formed between the end portions of the sub-array 125 and the end portions of the dielectric substrate. As a result, the pitch P2 between the radiating elements 122 facing each other across the end portions of the dielectric substrates between the antenna modules is larger than the pitch P1 between the radiating elements 122 in the sub-array 125 (P1<P2). That is, the pitch between the radiating elements 122 is partly uneven in the entire array antenna 100X. In such uneven disposition, if the radiation direction of the combined wave radiated from the array antenna 100X is tilted by beam forming, for example, a desired tilt angle is not implemented due to the influence of the widened pitch, or the peak gain at a specific tilt angle is reduced. The antenna characteristics may deteriorate as such.

In order to suppress such deterioration in characteristics, it is conceivable to reduce the size of the dielectric substrate to shorten the distance between the end portion of the sub-array and the end portion of the dielectric substrate. On the other hand, since the size of a mounted component such as an RFIC does not depend on the frequency of a radio wave to be radiated, a reduction in the size of the dielectric substrate may fail to secure a mounting area in the dielectric substrate. In particular, as the frequency of a radio wave to be radiated increases (i.e., as the wavelength decreases), the size of the radiating element and the interval between the radiating elements also decrease accordingly, and the size of the dielectric substrate further decreases, which may make it more difficult to secure the mounting area.

However, in the array antenna 100 according to the first embodiment, the sub-array 125 is disposed to be offset toward the adjacent antenna module with respect to the dielectric substrate without reducing the size of the dielectric substrate. With such a configuration, even if a target frequency becomes high, the size of the dielectric substrate 130 can be maintained to be a predetermined size or more, and the radiating elements 122 can be disposed at equal intervals in the entire array antenna 100. Therefore, it is possible to suppress the deterioration of the antenna characteristics while securing the mounting area of the mounted component.

(Influence of Extended Width of Dielectric Substrate)

Figure 5:
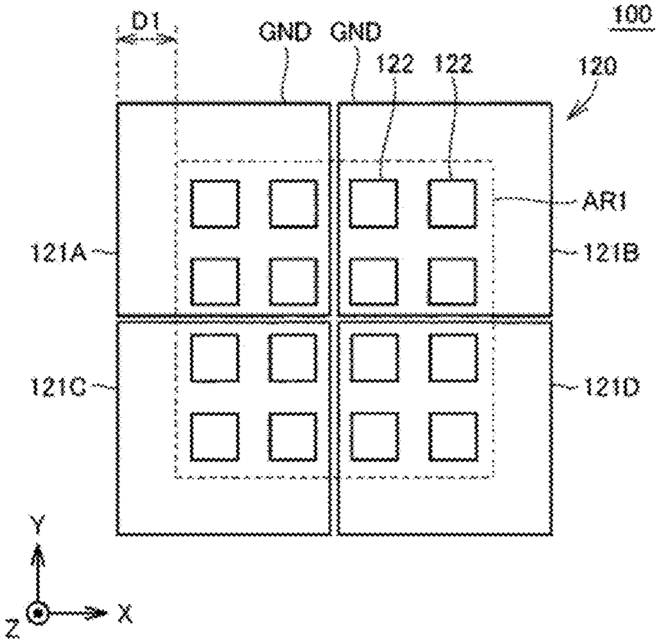
FIG. 5 is a plan view of an array antenna in which radiating elements are arranged in 4×4.
Figure 6:
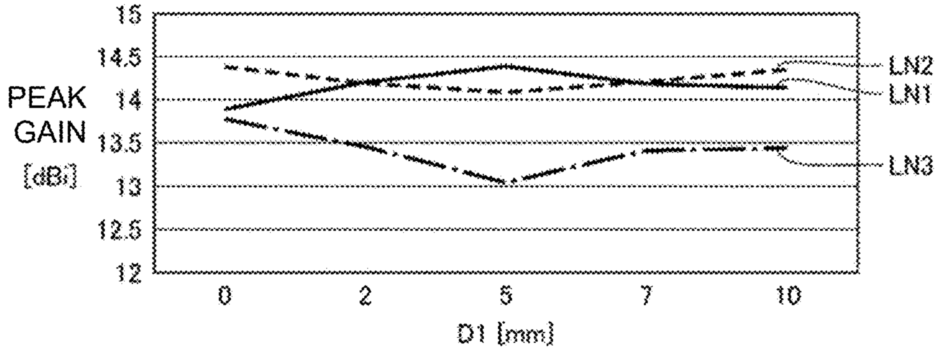
FIG. 6 is a graph for describing influence of an extended width of a ground electrode on directivity in the array antenna in FIG. 5.
Figure 7:
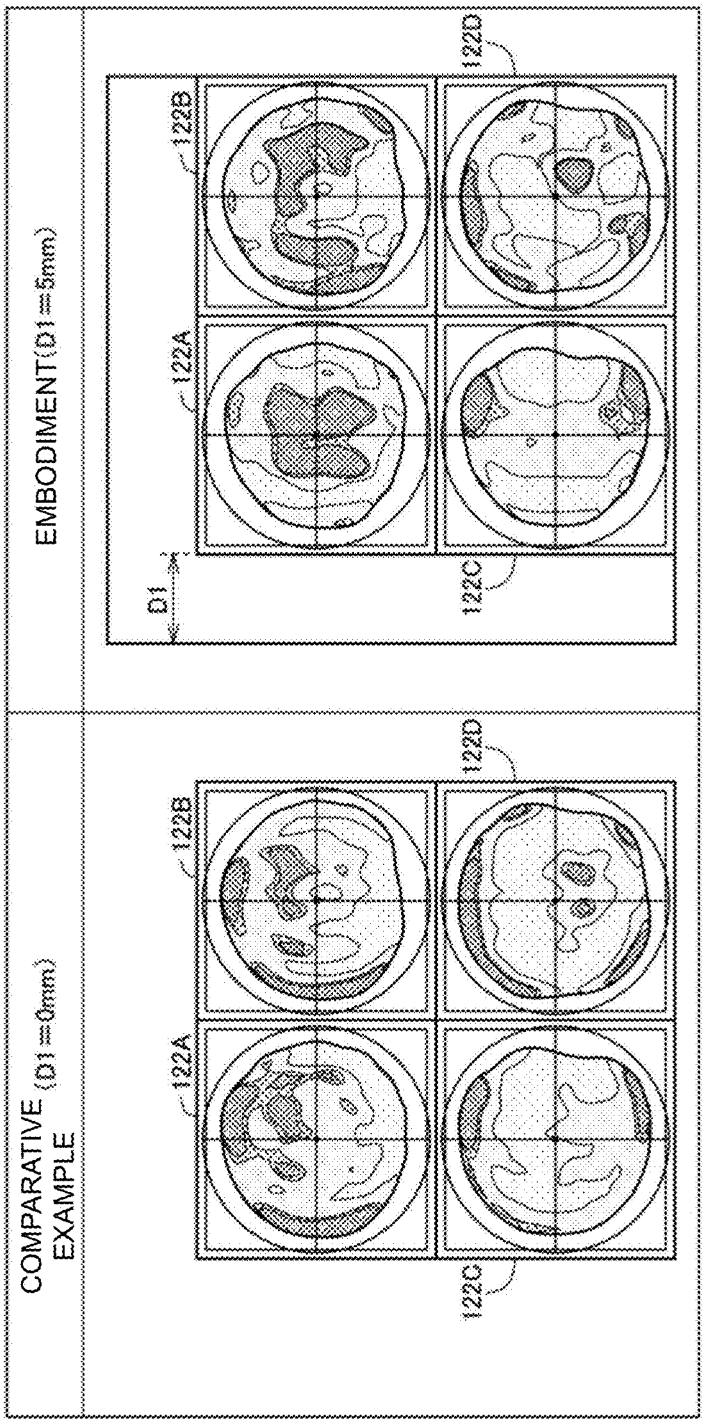
FIG. 7 is a diagram for describing a change in a beam pattern of each radiating element due to the extended width of the ground electrode in the array antenna in FIG. 5.

As described above, in the array antenna 100 according to the first exemplary embodiment, the sub-array 125 is disposed to be deviated with respect to the dielectric substrate 130. At this time, in the dielectric substrate 130, a margin (extended width) is formed between the sub-array 125 and the side opposite to the side (end portion) close to the sub-array 125. As described above, the ground electrode GND is disposed over the entire dielectric substrate 130. By disposing the sub-array 125 to be offset with respect to the dielectric substrate 130, the ground electrode GND in the portion of the extended width may affect the antenna characteristics. In FIGS. 5 to 7, the influence of the extended width on the antenna characteristics will be described.

FIG. 5 is a plan view of a case where the array antenna 100 includes the radiating elements 122 disposed in 4×4. Also in FIG. 5, in each antenna module forming the antenna apparatus 120, the sub-array formed of the plurality of radiating elements 122 is arranged to be offset toward the adjacent antenna module. Here, a region surrounding the four sub-arrays is defined as AR1, and a distance from each side of the region AR1 to the end portion of the dielectric substrate opposed to the side is defined as an extended width D1. In the simulations in FIGS. 6 and 7 described below, the center frequency of a radio wave radiated from the array antenna is 28 GHZ, and the wavelength λ of the radiated radio wave is about 10 mm.

FIG. 6 is a graph for describing the influence on the directivity of the combined wave when the value of the extended width D1 is changed in the array antenna 100 having the configuration in FIG. 5. In FIG. 6, the horizontal axis represents the extended width D1, and the vertical axis represents the peak gain. In FIG. 6, a solid line LN1 indicates a peak gain obtained when the radio wave is radiated in the normal direction of the dielectric substrate 130, that is, in the boresight direction (Z-axis direction). A broken line LN2 indicates a peak gain obtained when the radiation direction is inclined 60° in the elevation direction (Y-axis direction), and a chain line LN3 indicates a peak gain obtained when the radiation direction is inclined 60° in the azimuthal direction (X-axis direction).

As illustrated in FIG. 6, in a case where the radiation direction is not tilted (line LN1), the peak gain tends to increase as the extended width D1 increases from 0 mm, and the peak gain reaches the maximum when the extended width D1 is 5 mm. However, when the extended width D1 exceeds 5 mm, on the contrary, the peak gain tends to gradually decrease as the extended width D1 increases.

On the other hand, when the radiation direction is tilted in the azimuthal direction and the elevation direction (lines LN2 and LN3), the peak gain tends to decrease as the extended width D1 increases from 0 mm, and the peak gain reaches the minimum when the extended width D1 is 5 mm. When the extended width D1 exceeds 5 mm, on the contrary, the peak gain tends to gradually increase as the extended width D1 increases. In other words, when the radiation direction is tilted, the peak gain reaches the maximum at the extended width D1 being 0 mm and 10 mm.

The extended width D1 being 5 mm corresponds to a half-wavelength (λ/2) of the radiated radio wave. That is, when the radiation direction is not tilted, the peak gain can be maximized by setting the extended width D1 to (n+1/2)λ. In addition, when the radiation direction is tilted, the peak gain can be maximized by setting the extended width to nλ. Note that "n" is an integer greater than or equal to zero. In actual manufacturing, the extended width D1 is allowed to deviate from the above-described conditions by about ±λ/4.

FIG. 7 is a diagram for describing a change in the beam pattern of each of the radiating elements 122 in the antenna module 121A in a case where the extended width D1 is set to 0 mm (left diagram) and where the extended width D1 is set to 5 mm (right diagram). FIG. 7 illustrates examples of gain distributions in the radiating elements 122 in a plan view of the array antenna 100. In FIG. 7, the darker the hatching, the higher the gain.

As illustrated in FIG. 7, in a case where the extended width D1 is set to 5 mm, compared with the comparative example in which the extended width D1 is set to 0 mm, the gain near the center (i.e., in the boresight direction) increases in radiating elements 122A, 122B, and 122C at the end portions of the region AR1 in FIG. 5. On the other hand, in a radiating element 122D at the center of the region AR1, the gain near the center is decreased. From this, it is understood that when the extended width D1 of the ground electrode GND is increased, the influence on the gains of the radiating elements adjacent to the extended width D1 is large.

As illustrated in FIG. 6, the influence of the extended width D1 of the ground electrode GND varies depending on the inclination direction of the combined wave. Therefore, at the stage of designing the antenna, the gain of the array antenna can be improved by appropriately setting the extended width D1 in accordance with the radiation direction of the target combined wave.

As described above, in the array antenna according to the first exemplary embodiment, one antenna module is formed of the plurality of antenna modules disposed adjacent to each other, and in each antenna module, the sub-array is disposed to be offset toward the adjacent antenna module with respect to the dielectric substrate, and thus, it is possible to dispose the radiating elements at equal intervals in the entire array antenna. Therefore, in the array antenna, it is possible to suppress deterioration of the antenna characteristics due to uneven disposition of the radiating elements.

Note that the "antenna modules 121A to 121D" in the first exemplary embodiment correspond to a "first antenna module" to a "fourth antenna module" in the present disclosure, respectively. The "ground electrode GND" in the first exemplary embodiment corresponds to a "first ground electrode" in the present disclosure.

SECOND EMBODIMENT

In the array antenna 100 according to the first exemplary embodiment, an example in which the antenna modules 121A to 121D forming the antenna apparatus 120 have a square shape has been described. However, the shape of each antenna module is not limited to a square.

Figure 8:
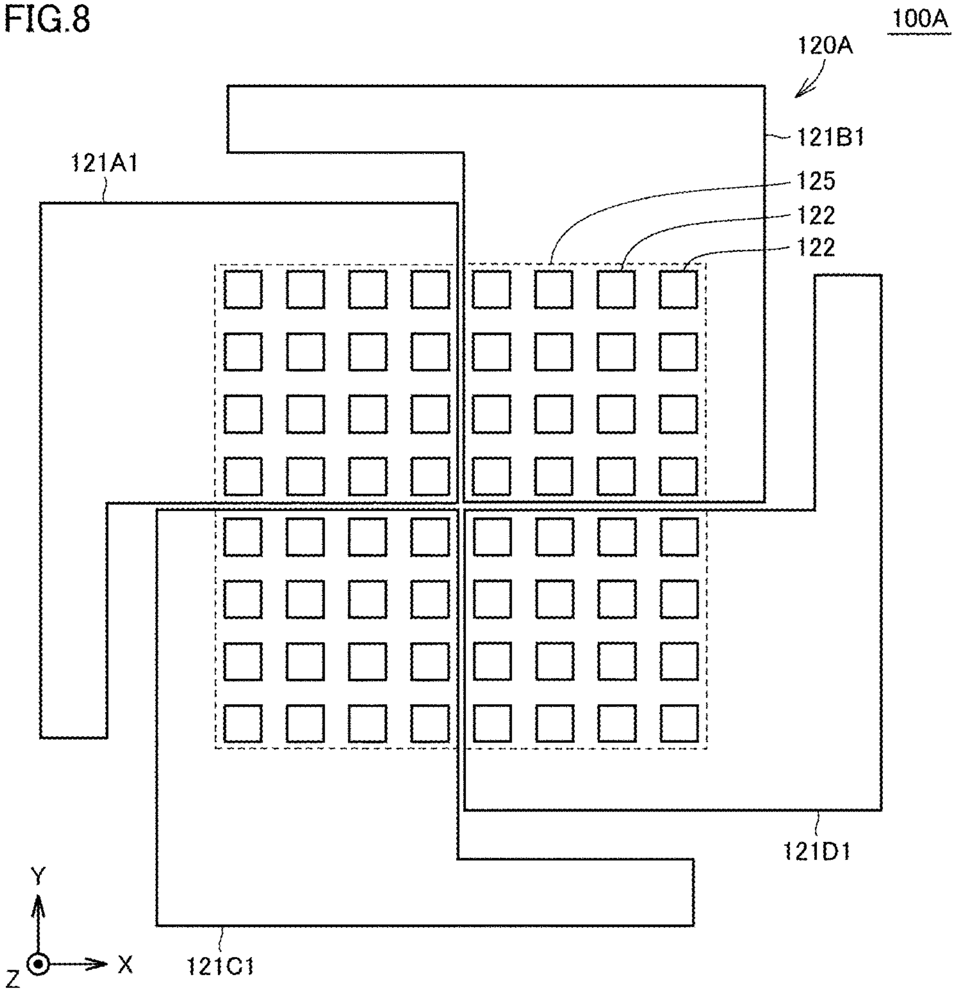
FIG. 8 is a plan view of an array antenna according to a second exemplary embodiment.

FIG. 8 is a plan view of an array antenna 100A according to a second exemplary embodiment. In the array antenna 100A, antenna modules 121A1 to 121D1 forming an antenna apparatus 120A have a shape different from a square. Specifically, the dielectric substrate in each of the antenna modules 121A1 to 121D1 has a shape in which a protruding portion is formed on one side of a rectangular region. The sub-arrays formed of the plurality of radiating elements 122 are disposed close to the adjacent end portion (side) in the rectangular region of the dielectric substrate of each antenna module. The antenna modules 121A1 to 121D1 are disposed to be rotationally symmetric to each other.

The array antenna 100A is also designed so that the pitch between the radiating elements 122 in the antenna module is equal to the pitch between the radiating elements 122 between the antenna modules.

In this way, even if the shape of the dielectric substrate is a shape other than a square, it is possible to dispose the radiating elements at equal intervals in the entire array antenna by disposing the sub-arrays to be deviated toward the end portion of the dielectric substrate adjacent to another antenna module. Therefore, in the array antenna, it is possible to suppress deterioration of the antenna characteristics due to uneven disposition of the radiating elements.

THIRD EMBODIMENT

In the first and second exemplary embodiments, the configuration in which the antenna apparatus is formed by combining the four antenna modules having the same shape has been described.

In a third exemplary embodiment, a configuration in which an antenna apparatus is formed by combining two antenna modules having the same shape will be described.

Figure 9:
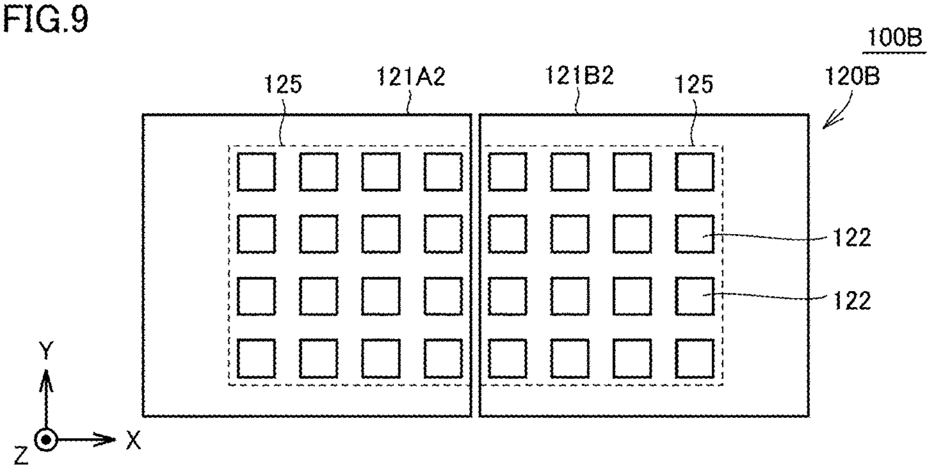
FIG. 9 is a plan view of an array antenna according to a third exemplary embodiment.

FIG. 9 is a plan view of an array antenna 100B according to the third exemplary embodiment. An antenna apparatus 120B of the array antenna 100B is formed of two antenna modules 121A2 and 121B2 disposed adjacent to each other in the X-axis direction.

In each of the antenna modules 121A2 and 121B2, the dielectric substrate has a rectangular shape. In the antenna module 121A2, the sub-array 125 formed of the plurality of radiating elements 122 is disposed to be deviated from the center of the dielectric substrate toward the end portion facing the antenna module 121B2. Likewise, in the antenna module 121B2, the sub-array 125 is disposed to be deviated from the center of the dielectric substrate toward the end portion facing the antenna module 121A2.

In this way, in the array antenna in which the antenna modules are formed by combining the two antenna modules having the same shape, the sub-array is disposed to be deviated toward one end portion facing the other antenna module. The two antenna modules are disposed so that the pitch between the radiating elements between the two antenna modules is equal to the pitch between the radiating elements in each antenna module.

With such a configuration, the pitch between 32 radiating elements in 8×4 can be made uniform in the entire array antenna, and thus, the antenna characteristics of the array antenna can be improved.

FOURTH EMBODIMENT

In a fourth exemplary embodiment, an example of the configuration of an array antenna in which an antenna apparatus is formed of six antenna modules will be described.

Figure 10:
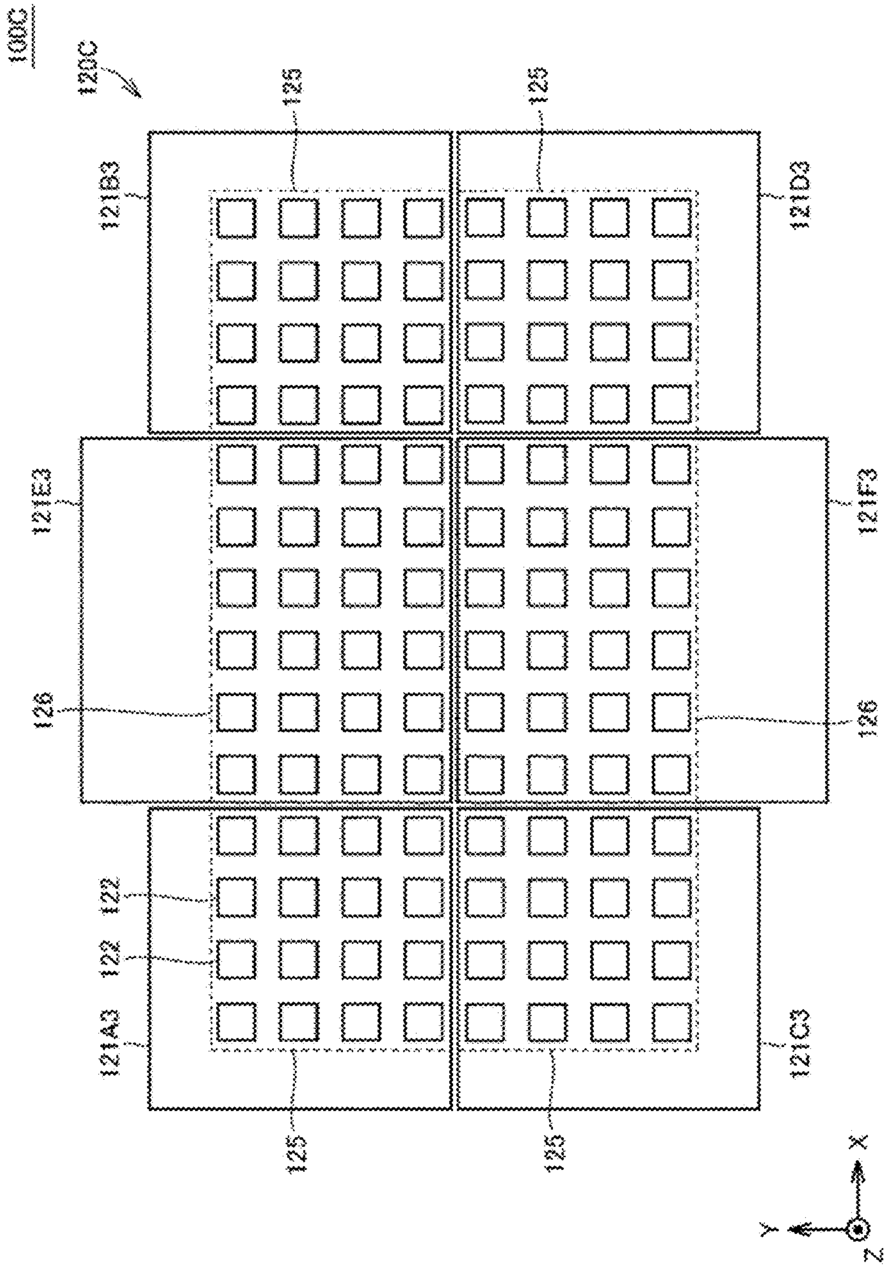
FIG. 10 is a plan view of an array antenna according to a fourth exemplary embodiment.

FIG. 10 is a plan view of an array antenna 100C according to the fourth exemplary embodiment. An antenna apparatus 120C in the array antenna 100C includes two rectangular antenna modules 121E3 and 121F3 in addition to four square antenna modules 121A3 to 121D3 that are substantially the same as in the array antenna 100 according to the first exemplary embodiment.

The antenna module 121E3 is disposed between and adjacent to the antenna module 121A3 and the antenna module 121B3 in the X-axis direction. In addition, the antenna module 121F3 is disposed between and adjacent to the antenna module 121C3 and the antenna module 121D3 in the X-axis direction. Furthermore, the antenna module 121E3 and the antenna module 121F3 are adjacent to each other in the Y-axis direction. That is, the antenna modules 121E3 and 121F3 are adjacent to other antenna modules in three directions.

Each of the antenna modules 121E3 and 121F3 includes a sub-array 126 formed of a total of 24 radiating elements 122 in 6×4. On each of the dielectric substrates of the antenna modules 121E3 and 121F3, the sub-array 126 is disposed to be deviated toward three end portions facing other adjacent antenna modules. In addition, each of the antenna modules 121A3 to 121F3 is disposed so that the pitch between the radiating elements between the adjacent antenna modules is equal to the pitch between the radiating elements in the antenna modules.

With such a configuration, the pitch between 112 radiating elements in 14×8 can be made uniform in the entire array antenna, and thus, the antenna characteristics of the array antenna can be improved.

MODIFICATION EXAMPLES

Modification examples (first to third modification examples) of a ground electrode in an antenna module and modification examples (fourth and fifth modification examples) of a dielectric substrate will be described with reference to FIGS. 11 to 15. The modification examples described below can be applied to the array antennas according to the first to fourth exemplary embodiments described above.

FIRST MODIFICATION EXAMPLE

Figure 11:
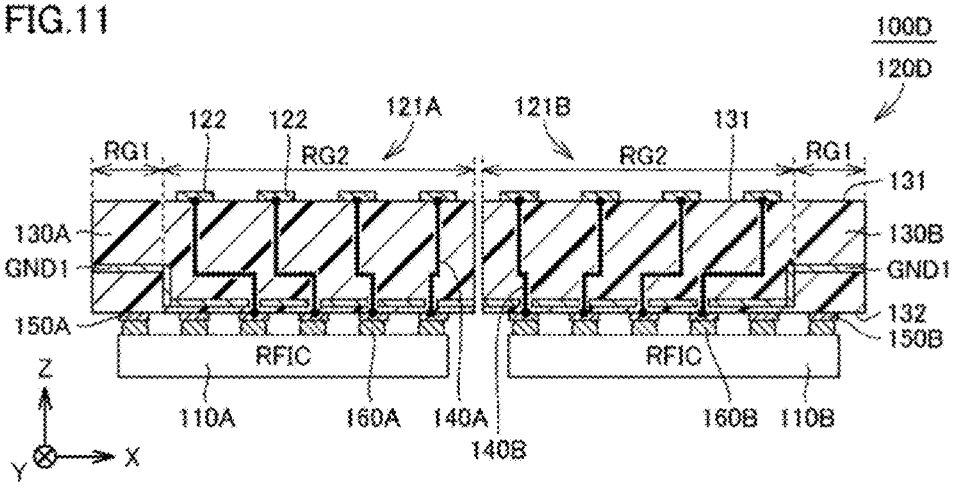
FIG. 11 is a cross-sectional view of an array antenna according to a first modification example.

FIG. 11 is a cross-sectional view of an array antenna 100D according to the first modification example. The array antenna 100D has a configuration in which a part of a ground electrode GND1 of each antenna module of an antenna apparatus 120D is disposed in a different layer of the dielectric substrate 130.

Specifically, in each antenna module, in a plan view from the normal direction of the dielectric substrate 130, if a region where the ground electrode GND1 and the sub-array 125 do not overlap each other is a region RG1 (first region) and a region where the ground electrode GND1 and the sub-array 125 overlap each other is a region RG2 (second region), the ground electrode GND1 in the region RG1 is disposed to be closer to the upper surface 131 of the dielectric substrate 130 than the ground electrode GND1 in the region RG2 is. In other words, the ground electrode GND1 in the region RG1 is disposed between the ground electrode GND1 in the region RG2 and the upper surface 131.

In the array antenna described in each of the above embodiments, the sub-array is disposed to be deviated with respect to the dielectric substrate (i.e., the ground electrode). In the region (region RG2) where the sub-array is disposed, the electrodes are disposed on both the upper surface side and the lower surface side of the dielectric substrate, but in the region (region RG1) where the sub-array is not disposed, the electrode is disposed only on the lower surface side. In this case, warpage may be generated in the dielectric substrate due to the difference in thermal expansion coefficient in the thickness direction of the dielectric substrate when the dielectric substrate is heated and cooled during manufacturing of the dielectric substrate.

In the array antenna 100D according to the first modification example, the ground electrode GND1 in the region RG1 where the sub-array is not disposed is disposed closer to the upper surface 131 than the ground electrode GND1 in the region RG2 is. With such a configuration, the difference in thermal expansion coefficient between the upper surface 131 side and the lower surface 132 side in the region RG1 can be reduced, and thus, deformation due to warpage during manufacturing of the dielectric substrate can be suppressed.

In the region RG1, a space formed between the ground electrodes GND1 and the lower surface 132 can also be used as a wiring layer.

Note that the "ground electrode GND1" in the first modification example corresponds to the "first ground electrode" in the present disclosure.

SECOND MODIFICATION EXAMPLE

Figure 12:
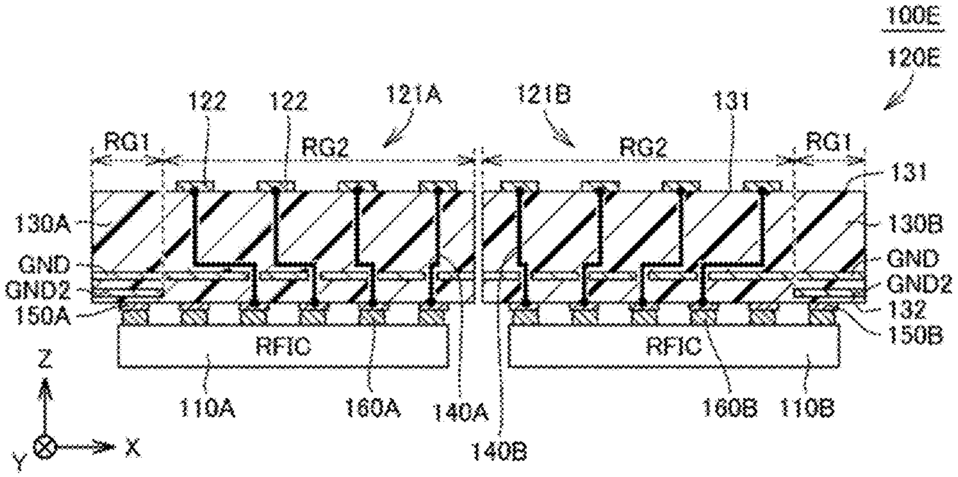
FIG. 12 is a cross-sectional view of an array antenna according to a second modification example.

FIG. 12 is a cross-sectional view of an array antenna 100E according to the second modification example. The array antenna 100E having a configuration in which the ground electrode of each antenna module of an antenna apparatus 120E is partly formed in two layers of the dielectric substrate 130 will be described.

Specifically, in each antenna module, in the region RG1 where the ground electrode GND and the sub-array 125 do not overlap each other in a plan view from the normal direction of the dielectric substrate 130, a ground electrode GND2 is disposed between the ground electrode GND and the lower surface 132.

As a result, the copper-remaining rate in the thickness direction in the region RG1 can be made closer to the copper-remaining rate in the region RG2, so that the generation of warpage or the like during manufacturing of the dielectric substrate 130 can be suppressed.

The "ground electrode GND" and the "ground electrode GND2" in the second modification example correspond to the "first ground electrode" and a "second ground electrode", respectively, in the present disclosure.

THIRD MODIFICATION EXAMPLE

Figure 13:
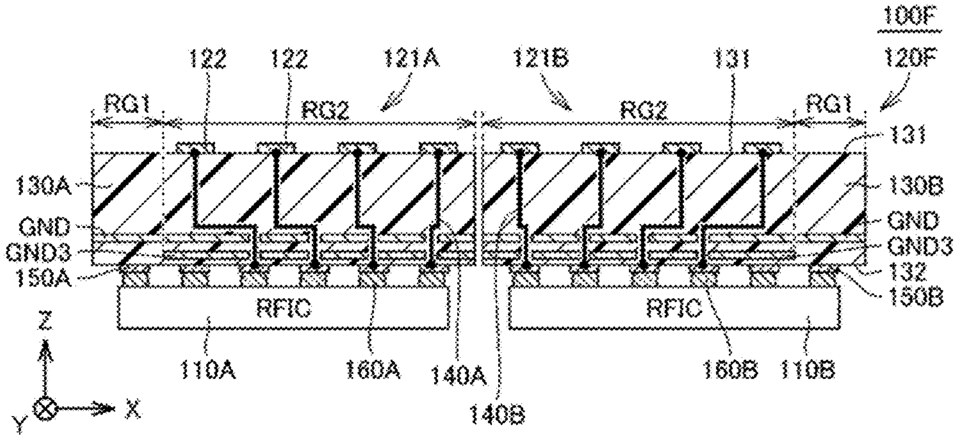
FIG. 13 is a cross-sectional view of an array antenna according to a third modification example.

FIG. 13 is a cross-sectional view of an array antenna 100F according to the third modification example. In the array antenna 100F as well, the ground electrode of each antenna module of an antenna apparatus 120F is partly formed in two layers of the dielectric substrate 130. However, unlike in the array antenna 100E according to the second modification example, in the region RG2 where the ground electrode GND and the sub-array 125 overlap each other in a plan view from the normal direction of the dielectric substrate 130, a ground electrode GND3 is disposed between the ground electrode GND and the lower surface 132.

The "ground electrode GND" and the "ground electrode GND3" in the third modification example correspond to the "first ground electrode" and a "third ground electrode", respectively, in the present disclosure.

FOURTH MODIFICATION EXAMPLE

Figure 14:
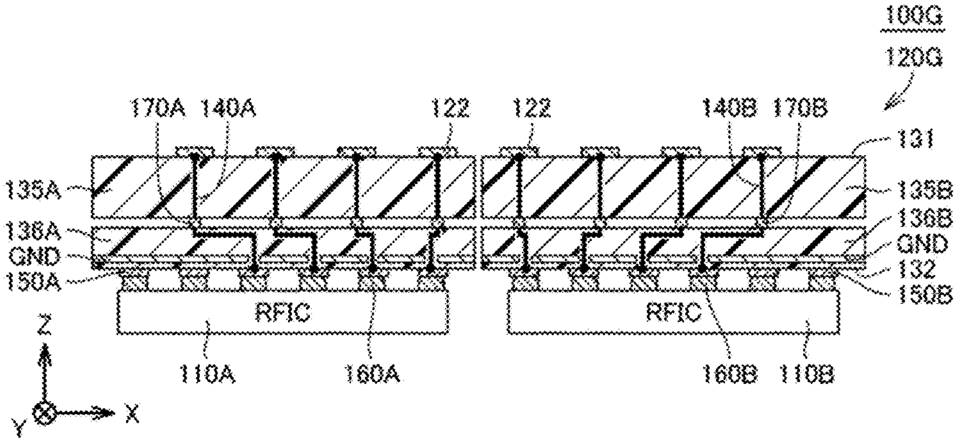
FIG. 14 is a cross-sectional view of an array antenna according to a fourth modification example.

FIG. 14 is a cross-sectional view of an array antenna 100G according to the fourth modification example. The array antenna 100G having a configuration in which the dielectric substrate of each antenna module of an antenna apparatus 120G is formed of two substrates will be described.

Referring to FIG. 14, in the antenna module 121A, the radiating elements 122 are disposed on a first substrate 135A, and the ground electrode GND is disposed in a second substrate 136A. The first substrate 135A and the second substrate 136A are formed in the same shape in a plan view of the dielectric substrate from the normal direction. The feed lines 140A are connected between the first substrate 135A and the second substrate 136A by connection members 170A such as solder bumps.

Likewise, in the antenna module 121B, the radiating elements 122 are disposed on a first substrate 135B, and the ground electrode GND is disposed in a second substrate 136B. The first substrate 135B and the second substrate 136B are formed in the same shape in a plan view of the dielectric substrate from the normal direction. The feed lines 140B are connected between the first substrate 135B and the second substrate 136B by connection members 170B such as solder bumps.

Such a configuration is applied to, for example, a case where the radiating elements 122 are disposed in a housing of the communication apparatus 10 and the RFIC 110 and the ground electrode GND are provided by using a different substrate. In this case, the first substrates 135A and 135B correspond to the housing of the communication apparatus 10.

With such a configuration, the degree of freedom of disposition in the communication apparatus 10 can be increased.

FIFTH MODIFICATION EXAMPLE

Figure 15:
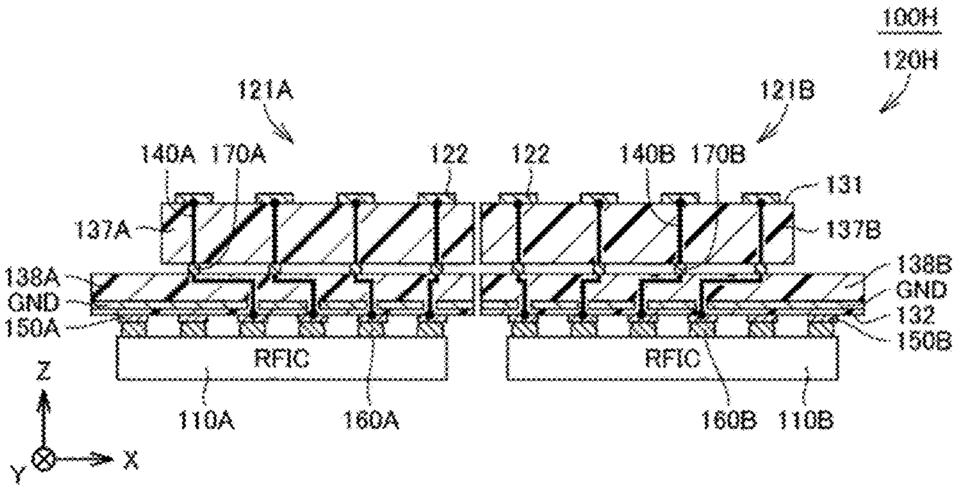
FIG. 15 is a cross-sectional view of an array antenna according to a fifth modification example.

FIG. 15 is a cross-sectional view of an array antenna 100H according to the fifth modification example. As in the fourth modification example, the array antenna 100H also has a configuration in which a first substrate 137 on which the radiating elements 122 are disposed and a second substrate 138 in which the ground electrode GND is disposed are separately provided in an antenna apparatus 120H. However, in the array antenna 100H according to the fifth modification example, the size of first substrates 137A and 137B in a plan view of the dielectric substrate from the normal direction is smaller than that of second substrates 138A and 138B.

In such a configuration, the first substrate 137 can be designed based on the size of the radiating element 122, and the second substrate 138 can be designed based on the size of the mounted component, so that the dielectric substrate can be optimally designed. In addition, since the structures of the substrates can be made symmetrical, warpage or deformation of the dielectric substrate can be reduced. Furthermore, the degree of freedom of disposition in the communication apparatus 10 can be increased.

SIXTH MODIFICATION EXAMPLE

In the above fourth and fifth modification examples, the dielectric substrate in each antenna module is constituted by the first substrate including the radiating elements and the second substrate including the ground electrode. In the sixth modification example, a case where the second substrate including the ground electrode is integrally formed in the entire array antenna will be described.

Figure 16:
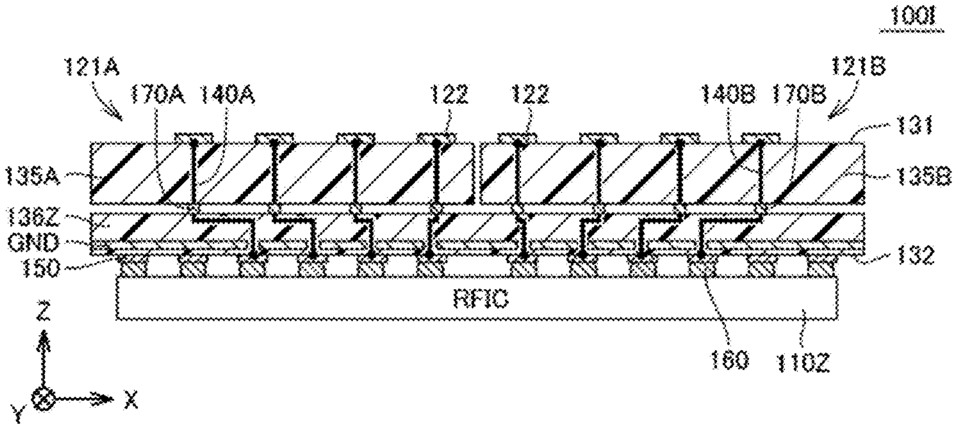
FIG. 16 is a cross-sectional view of a first example of an array antenna according to a sixth modification example.
Figure 17:
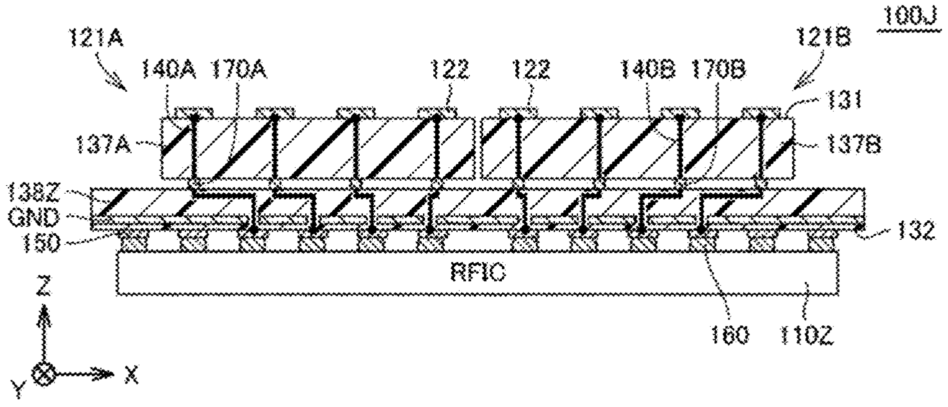
FIG. 17 is a cross-sectional view of a second example of the array antenna according to the sixth modification example.

FIGS. 16 and 17 are cross-sectional views of array antennas 100I and 100J, respectively, according to the sixth modification example. The array antenna 100I in FIG. 16 is an example of a case where the second substrates 136A and 136B in the configuration of the above fourth modification example are formed of an integrated substrate 136Z. In addition, the array antenna 100J in FIG. 17 is an example of a case where the second substrates 138A and 138B in the configuration of the above fifth modification example are formed of an integrated substrate 138Z. In these examples, each of the first substrates 135A, 135B, 137A, and 137B on which the radiating elements 122 are disposed is the antenna module 121A or 121B, and a sub-array is formed of the plurality of radiating elements 122 arranged on each first substrate.

In this case, the RFIC that supplies a high-frequency signal to the radiating elements 122 may be disposed for each antenna module as in the fourth and fifth modification examples, or one RFIC 100Z may be disposed for the entire array antenna as in FIGS. 16 and 17.

With such a configuration, it is possible to form an array antenna having various configurations by combining antenna modules in which only radiating elements are disposed on a common substrate in which a ground electrode is disposed.

Note that each of the "second substrates 136Z and 138Z" in the sixth modification example corresponds to a "first dielectric substrate" in the present disclosure, and each of the "first substrates 135A, 135B, 137A, and 137B" corresponds to a "second dielectric substrate" in the present disclosure.

It is understood that the exemplary embodiments disclosed herein are illustrative and non-restrictive in every respect. The scope of the present disclosure is defined by the claims, rather than the description of the exemplary embodiments given above, and is intended to include any modifications within the scope and meaning equivalent to the claims.

REFERENCE SIGNS LIST

10 communication apparatus
100, 100A to 100J, 100X array antenna
110, 110A to 110D, 110Z RFIC
111A to 111D, 113A to 113D, 117 switch
112AR to 112DR low-noise amplifier
112AT to 112DT power amplifier
114A to 114D attenuator
115A to 115D phase shifter
116 signal combiner/divider 1118 mixer
119 amplifier circuit
120, 120A to 120H, 120X antenna apparatus
121, 121A to 121D, 121A1 to 121A3, 121B1 to 121B3, 121C1, 121C3, 121D1, 121D3, 121E3, 121F3, 121V to 121Y antenna module
122, 122A to 122D radiating element
125, 126 sub-array
130, 130A, 130B dielectric substrate
131 upper surface
132 lower surface
135A, 135B, 137, 137A, 137B first substrate
136A, 136B, 136Z, 138, 138A, 138B, 138Z second substrate
140, 140A, 140B feed line
150, 150A, 150B connection terminal
160, 160A, 160B solder bump
170A, 170B connection member
200 BBIC
E1A, E1B, E2A, E2B end portion
GND, GND1 to GND3 ground electrode
SP1, SP2 feed point

The invention claimed is:

1. An array antenna formed of a plurality of antenna modules disposed adjacent to each other,
the plurality of antenna modules each comprising:
a dielectric substrate including a first surface that faces a second surface;
a first ground electrode disposed in the dielectric substrate; and
a sub-array formed of a plurality of radiating elements facing the first ground electrode, wherein
in the sub-array, the plurality of radiating elements are arranged in a matrix, each radiating element includes multiple feeding points,
the sub-array is disposed along a first end portion of the dielectric substrate,
the sub-array has a center deviated from a center of the dielectric substrate toward the first end portion,
the plurality of antenna modules include a first antenna module adjacent to a second antenna module,
the first end portion of the first antenna module faces the first end portion of the second antenna module in a first direction that is defined as a direction from the first antenna module toward the second antenna module, and
the first antenna module is rotationally symmetric to the second antenna module.

2. The array antenna according to claim 1, wherein
in each of the plurality of antenna modules,
the sub-array is disposed closer to the first surface than the first ground electrode in the dielectric substrate is,
each of the plurality of antenna modules further includes a plurality of connection terminals disposed on the second surface of the dielectric substrate, and
in each of the plurality of antenna modules, in a plan view from a normal direction of the dielectric substrate,
the first ground electrode is larger than a region of the sub-array, and
at least one of the plurality of connection terminals is disposed in a region of the dielectric substrate where the first ground electrode does not overlap the sub-array.

3. The array antenna according to claim 1, wherein
in each of the plurality of antenna modules, the plurality of radiating elements are arranged in a matrix at intervals of a first pitch,
the first antenna module and the second antenna module are disposed such that an interval between radiating elements adjacent to each other across the first end portions is a second pitch, and
the first pitch is equal to the second pitch.

4. The array antenna according to claim 1, wherein each radiating element includes two feeding points.

5. The array antenna according to claim 1, wherein
in each of the plurality of antenna modules,
the dielectric substrate includes a second end portion orthogonal to the first end portion,
the sub-array is disposed along the second end portion, and
the sub-array has a center deviated from the center of the dielectric substrate toward the second end portion.

6. The array antenna according to claim 5, wherein
the plurality of antenna modules further include:
a third antenna module disposed adjacent to the second end portion of the first antenna module; and
a fourth antenna module adjacent to the second end portion of the second antenna module and adjacent to the third antenna module.

7. The array antenna according to claim 1, wherein each of the plurality of antenna modules is configured to radiate a radio wave polarized in the first direction and a radio wave polarized in a second direction orthogonal to the first direction.

8. The array antenna according to claim 1, wherein, in each of the plurality of antenna modules, the dielectric substrate has a square shape.

9. The array antenna according to claim 8, wherein
in each of the plurality of antenna modules,
a wavelength of a radio wave radiated from the sub-array is λ,
a maximum distance from an end portion of the sub-array to an end portion of the dielectric substrate in an arrangement direction of the plurality of radiating elements is $(n+1/2)\lambda$, and
n is an integer greater than or equal to zero.

10. The array antenna according to claim 1, wherein, in each of the plurality of antenna modules, no component other than the sub-array is disposed on the first surface of the dielectric substrate.

11. The array antenna according to claim 1, wherein
in each of the plurality of antenna modules, in a plan view from a normal direction of the dielectric substrate, a region where the first ground electrode does not overlap the sub-array is defined as a first region, and a region where the first ground electrode overlaps the sub-array overlap is defined as a second region, and
the first ground electrode in the first region is disposed between the first surface and the first ground electrode in the second region in the normal direction of the dielectric substrate.

12. The array antenna according to claim 1, wherein
in each of the plurality of antenna modules, in a plan view from a normal direction of the dielectric substrate, a region where the first ground electrode does not overlap the sub-array is defined as a first region, and a region where the first ground electrode overlaps the sub-array is defined as a second region, and
each of the plurality of antenna modules further includes a second ground electrode disposed between the first ground electrode and the second surface in the first region.

13. The array antenna according to claim 1, wherein
in each of the plurality of antenna modules, in a plan view from a normal direction of the dielectric substrate, a region where the first ground electrode does not overlap the sub-array is defined as a first region, and a region where the first ground electrode overlaps the sub-array overlap is defined as a second region, and
each of the plurality of antenna modules further includes a third ground electrode disposed between the first ground electrode and the second surface in the second region.

14. The array antenna according to claim 1, wherein, in each of the plurality of antenna modules, the dielectric substrate includes a first substrate on which the sub-array is disposed, and a second substrate in which the first ground electrode is disposed.

15. The array antenna according to claim 1, wherein each of the plurality of antenna modules further includes a feeder circuit that supplies a high-frequency signal to the plurality of radiating elements.

16. The array antenna according to claim 15, wherein, in each of the plurality of antenna modules, in a plan view from a normal direction of the dielectric substrate, a region of the dielectric substrate where the feeder circuit is disposed is larger than a region where the sub-array is disposed.

17. The array antenna according to claim 15, wherein, in each of the plurality of antenna modules, in a plan view from a normal direction of the dielectric substrate, at least part of the feeder circuit is disposed outside a region of the dielectric substrate where the sub-array is disposed.

18. An antenna module configured to form an array antenna by being disposed adjacent to another antenna module, the antenna module comprising:
a dielectric substrate;
a ground electrode disposed in the dielectric substrate; and
a sub-array formed of a plurality of radiating elements facing the ground electrode, wherein
the plurality of radiating elements are arranged in a matrix,
each radiating element includes multiple feeding points,
the sub-array is disposed along a first end portion of the dielectric substrate, and
the sub-array has a center deviated from a center of the dielectric substrate toward the first end portion,
wherein the antenna module is arranged in rotational symmetry with at least one other antenna module.

19. The antenna module according to claim 18, wherein
the plurality of radiating elements are arranged in a matrix at intervals of a first pitch, and
the sub-array is disposed such that a distance between the sub-array and the first end portion is ½ of the first pitch.

20. An array antenna comprising:
a first dielectric substrate;
a ground electrode disposed in the first dielectric substrate; and
a plurality of antenna modules disposed adjacent to each other on the first dielectric substrate, wherein
each of the plurality of antenna modules includes:
a second dielectric substrate; and
a sub-array formed of a plurality of radiating elements facing the ground electrode,
in the sub-array, the plurality of radiating elements are arranged in a matrix,
each radiating element includes multiple feeding points,
the sub-array is disposed along a first end portion of the second dielectric substrate,
the sub-array has a center deviated from a center of the second dielectric substrate toward the first end portion,
the plurality of antenna modules include a first antenna module adjacent to a second antenna module,
the first end portion of the first antenna module faces the first end portion of the second antenna module in a first direction that is defined as a direction from the first antenna module toward the second antenna module, and
the first antenna module is rotationally symmetric to the second antenna module.

* * * * *